Figure 1:
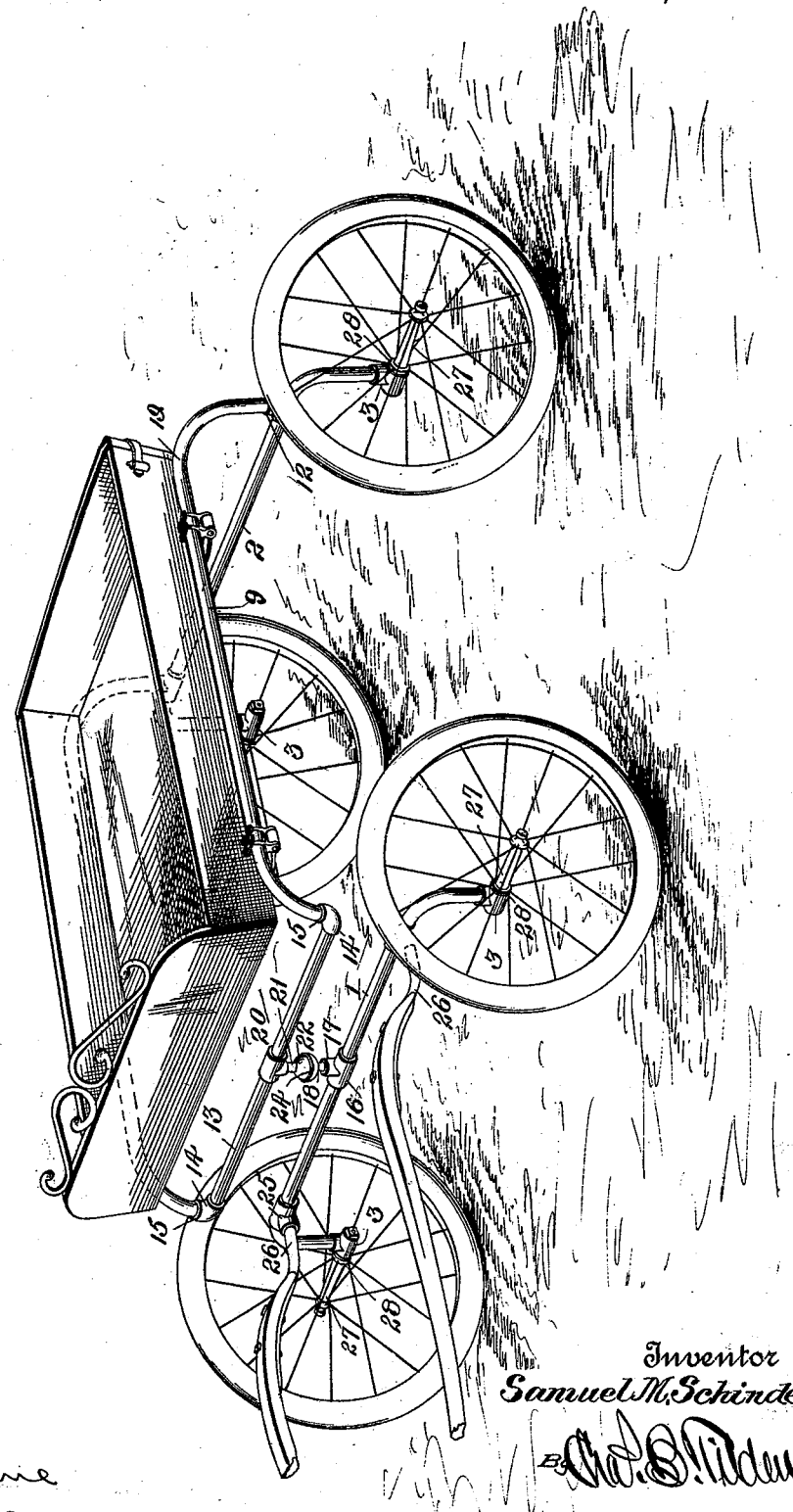

(No Model.)
2 Sheets—Sheet 1.

S. M. SCHINDEL.
VEHICLE.

No. 551,146.
Patented Dec. 10, 1895.

Witnesses

Inventor
Samuel M. Schindel
his Attorney (No Model.) 2 Sheets—Sheet 2.

S. M. SCHINDEL.
VEHICLE.

No. 551,146. Patented Dec. 10, 1895.

Witnesses
John Smire
Geo. Gray Tilden

Inventor
Samuel M. Schindel
by Chas. B. Tilden
Attorney

UNITED STATES PATENT OFFICE.

SAMUEL MILFORD SCHINDEL, OF HAGERSTOWN, MARYLAND.

VEHICLE.

SPECIFICATION forming part of Letters Patent No. 551,146, dated December 10, 1895.

Application filed October 23, 1894. Serial No. 526,759. (No model.)

*To all whom it may concern:*

Be it known that I, SAMUEL MILFORD SCHINDEL, a citizen of the United States, residing at Hagerstown, in the State of Maryland, have invented new and useful Improvements in the Bicycle Type of Vehicles, of which the following is a specification.

It is the purpose of my invention to provide a wagon, buggy, or other similar vehicle having a frame composed throughout of light but strong metallic tubes and supported upon wheels constructed in essential respects like those used upon bicycles employing pneumatic tires, the frame having such construction as to secure the necessary height of the box without increasing the diameter of the ordinary bicycle-wheels, which are capable of turning beneath the frame without contact therewith.

It is a further purpose of my invention to provide a vehicle of the type named which shall consist of a rigid, practically homogeneous, tubular structure throughout, provision being made for the support of the spindles or wheel-bearings and for the attachment of the thills, whereby said parts are made rigid portions of the structure, and a pivotal connection being made between the forward axle and the other parts of the rigid frame of such character that the thills shall have all the play required, the penetration of dust and grit to the bearings shall be effectually avoided, and the whole structure simplified and decreased in weight, its external appearance rendered symmetrical and graceful, rattling and other noises in the running-gear prevented, and the constituent parts made largely in duplicate, whereby the labor and expense of removing worn-out or damaged portions and replacing the same shall be materially diminished.

My invention also comprises the provision of a king-bolt or pivotal connection between the forward axle and the frame, which shall be of novel construction, have the minimum friction and wear, be dust-proof, and afford a universal pivotal movement like a ball-and-socket joint, which it resembles in its essential features.

It is my purpose, also, to provide a vehicle-frame of novel construction, to combine the box or body with said frame in such manner as to distribute the weight to points as near the wheels as possible, thereby enabling me to use lighter axles, and to provide a novel construction for effecting the rigid union of the tubular members of the frame and for the attachment of the wheel-spindles, thills, and king-bolt.

To these ends my invention consists in the novel features of construction and in the parts and combinations of parts hereinafter fully explained, and then particularly pointed out and defined in the claims which conclude this specification.

To enable those skilled in the art to which my invention pertains to fully understand and use the same, I will proceed to describe said invention in detail, reference being had for this purpose to the accompanying drawings, in which—

Figure 2:
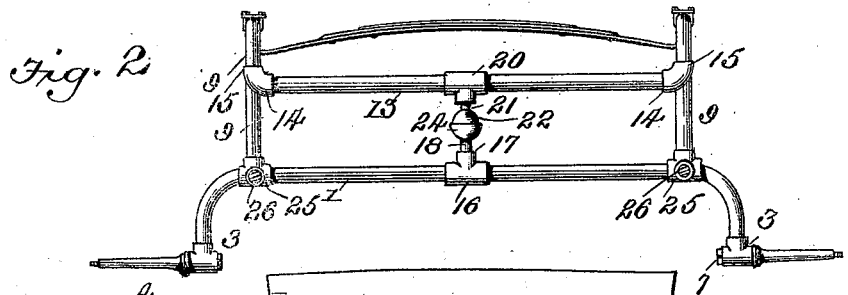
Figure 3:
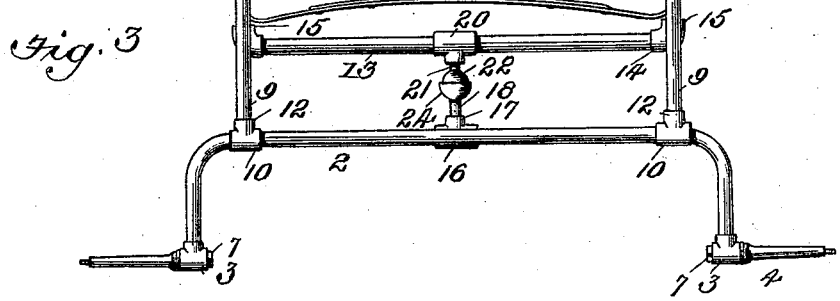
Figure 4:
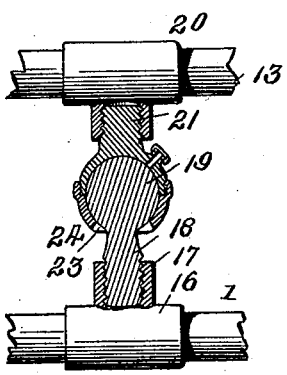
Figure 5:
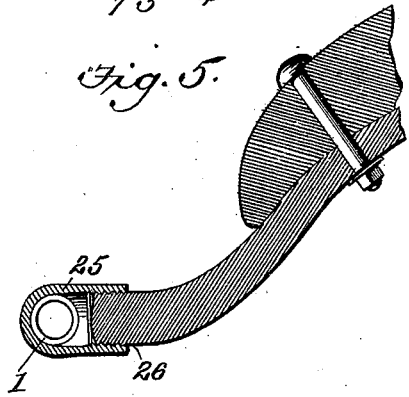
Figure 6:
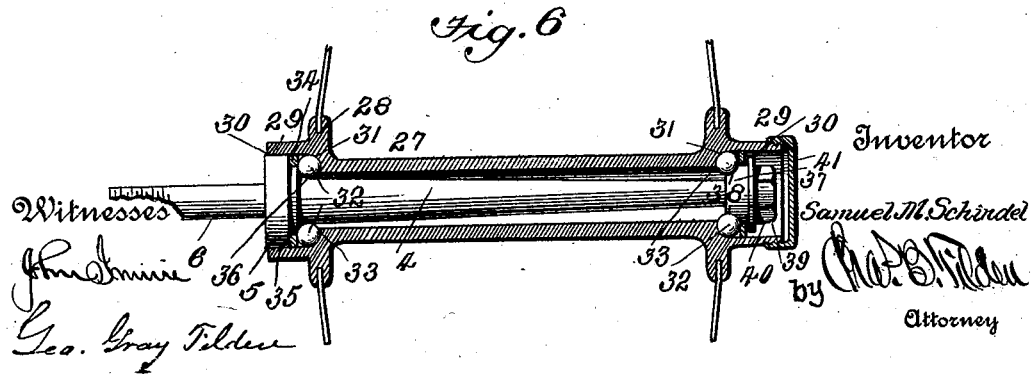

Figure 1 is a perspective view of a vehicle embodying my invention. Fig. 2 is a front elevation with the body removed. Fig. 3 is a rear elevation with body and springs attached. Fig. 4 is a detail section of the pivotal connection between the frame and the front cross-bar. Fig. 5 is a detail section showing the thill connection. Fig. 6 is a similar view showing one of the wheel-bearings.

The reference-numeral 1, in said drawings, refers to, or indicates, the forward axle, and the numeral 2 the rearward axle, each being formed of a metallic tube, preferably of steel, and arched or bent at points near the extremities into curves comprising about ninety degrees of arc, whereby the extreme ends of each tubular portion are brought into perpendicular lines, or substantially so, the curve being upon such a radius that the straight body of the tubular axle will be elevated above the downwardly-turned ends somewhat more than half the diameter of the bicycle-wheels used, which will usually be of about twenty-eight inches diameter, though this dimension may be varied, if desired. Upon each downwardly-turned end of the tubular axle is mounted a fitting 3, having a socket which receives the tubular end, which is brazed therein. An aperture is formed in the fitting below the brazed joint, and the spindle is attached in the following manner.

The spindle 4, which is formed in the manner ordinarily seen in those bicycles having ball-bearings, is provided with a collar 5, between the spindle and a threaded shank 6, which is passed through the aperture in the fitting until the collar 5 lies against the outer face of the latter. A nut 7 is then turned upon the threaded end opposite the inner face of the fitting, against which it has bearing, thus drawing the collar 6 against the outer face with any required force and making a firm, strong, and perfectly rigid attachment. All four of the spindles, or wheel-bearings, are mounted upon the axles in a similar manner, and being duplicates in form and size, the simplicity of this construction enables the user to remove and replace any one or more of the number with but little labor, besides allowing the substitution of new spindles for those which become worn or damaged, without requiring the employment of skilled labor, or requiring special tools for such purpose. The wheels are also interchangeable at will, and any one may be placed upon any one of the spindles.

The rearward axle is connected to the cross-bar at the forward end of the frame by side perches, or perch-pieces 9, also of tubular form, each being arched or bent at its two ends into a curve substantially similar to that employed in the axles, though the radius of the curve may be greater or less, as circumstances or choice may dictate. The perch-pieces are connected to the rearward axle by means of T-shaped fittings, each having a cross-head 10, which embraces and is brazed to the axle, while the central portion 12 is provided with a socket which receives the downwardly-turned end of the perch-piece, the joint being completed by brazing. At their forward ends the perch-pieces are united to the forward tubular cross-bar 13 by means of L-shaped fittings, each consisting of a part 14, having a socket to receive the end of the cross-bar, and an upwardly-turned portion 15, having a substantially similar construction to receive the downwardly-turned forward end of the perch-piece, both joints being completed by brazing.

The connection between the cross-bar 13 and the forward axle is made in the following manner: Upon the central portion of said axle is mounted a T-shaped fitting 16, its cross-head surrounding and brazed to the axle and its central member 17 turned upward and provided with an aperture having a female thread. In this aperture is screwed a threaded bolt 18, having on its upper end a spherical head 19. The cross-bar 13 is provided with a T-shaped fitting 20, similar in all respects to that upon the axle, save that its central member is turned downward. The latter is provided with a threaded socket, into which is screwed a bolt 21, its lower end being provided with a head having a substantially hemispherical socket 22 of such diameter as to fit upon the spherical head 19 of the bolt 18. The latter, before it is screwed into the fitting 16, is inserted in a circular opening 23 in a concavo-convex annulus 24, which is screwed upon the outer face of the head of the bolt 21, thereby confining the spherical head 19 in its socket. The opening 23 is of such diameter as to permit all the necessary play of the bolt 21 in all directions.

The thill attachment is effected by mounting upon the forward axle at suitable points T-shaped fittings 25, similar in form those already described. The central members of these fittings are provided with sockets which receive the thill connections 26, the latter being screwed into the threaded sockets or otherwise suitably attached and their projecting portions being curved to conform to the thills, which are bolted or otherwise suitably fastened thereto. It will be observed that this connection is rigid, as the construction of the king-bolt, or pivotal bearing for the forward axle, permits all the necessary vertical movements of the thills.

The wheels, which are of the bicycle pattern, are provided with hubs 27, having flanges 28 to receive the spokes, which may be of wood or metal, the wooden spokes being of ordinary construction and mortised in the hub. At each end of the hub is a circular flange 29, inclosing a chamber 30, of somewhat greater diameter than the bore of the hub. In each chamber is formed a channel 31 for the balls 32. This channel is formed in such manner that a shoulder 33 lies between the same and the chamber 30, the angle of said shoulder projecting into the chamber and toward the axis of the hub. When the balls are placed in the channel 31, an annulus 34 is forced into the chamber 30 until it lies against the shoulder 33 and confines the balls in place.

The spindle or wheel bearing at its inner end is provided with a shoulder 35, which lies against or near the outer face of the annulus 34. The spindle is then reduced to enter the annulus and beyond the latter it is contracted to form a concave-surface 36, which bears against the balls, the thrust being in lines between the vertical and horizontal. The spindle is tapered toward its outer end, which receives a ball-bearing cone 37, having a concave face 38 similar to that of the inner end of the spindle. The outer face of the ball-bearing cone is substantially flush with the annulus, and a washer 39 is placed between it and a jam-nut 40, screwed on the outer extremity of the spindle. The outer end of the hub is closed by a dust-cap 41, which is screwed on the outer face of the flange 29.

What I claim is—

1. A vehicle having a frame consisting of arched perch-pieces, arched metallic axles, and a front cross-bar, connected to the forward axle by a suitable universal bearing, and thills having rigid connection with said front axle, substantially as described.

2. A vehicle having a frame composed of fore and rear axles each of tubular metal and having ends turned vertically downward and provided with openings to receive the inner ends of the wheel spindles, of perch-pieces also of tubular metal and bent from their ends upward to raise the perches above the reach of the wheels, and then extended horizontally from front to rear, substantially as described.

3. A pivotal connection for a vehicle between the front axle and the cross-bar of the frame, consisting of a spherical head detachably connected by a threaded shank to a socket rigidly mounted on the fore axle, a concavo-convex annulus surrounding the lower part of the head, and a hemispherical socket to inclose the other part, said socket being rigidly but detachably secured by a threaded shank to a sleeve on the cross-bar of the frame and having a thread to engage an opposite thread on the annulus, substantially as described.

4. A vehicle having a frame composed of tubular metal throughout, thill-connections rigidly secured to the forward arched axle, and a ball and socket connection between said axle and the cross-bar of the frame, substantially as described.

In testimony whereof I have hereunto set my hand in presence of two subscribing witnesses.

SAMUEL MILFORD SCHINDEL.

Witnesses:
HOWARD M. NORRIS,
CHAS. B. TILDEN.